(No Model.)
J. W. MALOY.
MACHINE FOR CURVE SAWING IN STONE.
No. 364,834. Patented June 14, 1887.
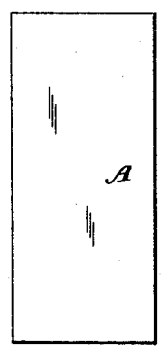
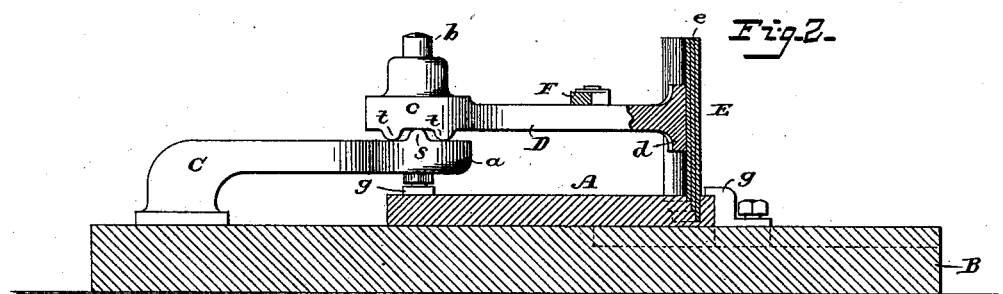
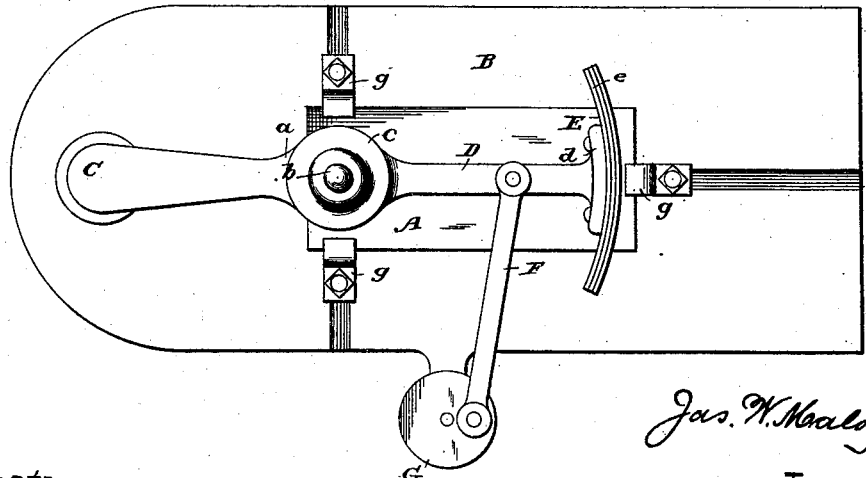
Attest:
Court A. Cooper,
H. E. F. Fansmann.
Jas. W. Maloy,
Inventor:
By Foster & Freeman
Attys

UNITED STATES PATENT OFFICE.

JAMES W. MALOY, OF SOMERVILLE, MASSACHUSETTS.

MACHINE FOR CURVE-SAWING IN STONE.

SPECIFICATION forming part of Letters Patent No. 364,834, dated June 14, 1887.

Application filed October 23, 1885. Serial No. 180,753. (No model.)

*To all whom it may concern:*

Be it known that I, JAMES W. MALOY, a citizen of the United States, and a resident of Somerville, in the county of Middlesex and State of Massachusetts, have invented certain new and useful Improvements in Machines for Curve-Sawing in Stone, of which the following is a specification.

My invention relates to machines for cutting slabs of stone, slate, &c.; and it consists of a tool and means for guiding it to travel in a circular or curved path in contact with the slab, so as to impart a curved edge to the latter without breaking up and wasting the portion which is removed beyond said edge.

In the drawings, Figure 1 is a face view of the slab. Fig. 2 is a sectional elevation of a machine illustrating my invention, and Fig. 3 is a plan of Fig. 2.

In the ordinary course of manufacturing tombstones and in imparting curved or rounded ends to slabs of marble or stone, it is common to cut away that portion of the slab which is beyond the curved edge imparted by the cutting operation. For instance, the slab to be operated upon is marked with a curved or other line near one end, according to the form of edge desired, and the portion beyond this line is chipped away and wasted, the operation requiring to be done by hand. If it then be desired to impart an ornamental form to the edge, this is done by hand or by means of suitable tools to reduce it to an ogee or other desired shape, as shown in Fig. 2. In order to avoid the objections incident to this mode of manufacturing such articles, I saw each slab by means of a reciprocating curved saw consisting of one or more blades, or other suitable tool, so as to cut the slab upon a curved line without injury to the portion beyond said line, which may be thereafter formed of such shape as may be desired, thereby utilizing instead of wasting it; and when the edge is to be ornamental I use a cutter-tool of such construction as will impart the desired form to the edge in the act of separating the terminal portion from the body of the slab.

Different apparatus may be used in carrying out this mode of manufacture, that shown in Figs. 2 and 3 being effective and being intended to effect the cutting operations by means of a reciprocating tool.

B is the bed-plate of the machine, which supports an overhanging arm, C, terminating in a circular head, a, from the center of which a pin, b, projects upward through the hub c of a vibrating arm, D. At the end of the arm D is a curved bearing, d, to which are bolted a series of thin cutting-blades, e, constituting a curved cutter-tool, E, and the lower edges of which are adapted to bear upon the slab A, which is secured to the bed B by means of clamps g, or otherwise. The blades e are curved to correspond to a circle of which the pin b is the center, and the arm D is reciprocated upon the pin while the lower edges of the cutting-blades are in contact with the slab, so that the latter is gradually cut upon a curved line corresponding to the curve of the blades, and by adjusting the blades to different heights, as shown, an ornamental form may be imparted to the edge at the same time that the cut is made. By this means the portion separated from the slab is not injured, so that it can be rendered available for other purposes, while an ornamental form is imparted to the edge of the slab at the same time it is cut, thereby avoiding any subsequent operation for this purpose.

Any desired means may be employed for reciprocating the arm D. For instance, it may be connected to a rod, F, the opposite end of which receives the wrist-pin upon a driving-disk, G, to which a rotary motion is imparted from a belt or otherwise.

In order to facilitate the cutting operations, it is advisable to introduce fresh sand constantly beneath the edges of the cutters. To effect this, I lift the cutter-tool at intervals to permit the sand to flow down within the kerf. One means of lifting the cutter is to provide the head a and the hub c with lugs or projections s t, which are brought in contact and carried one over the other as the arm completes its movement in one direction, the arm being thereby lifted with its cutters for the purpose described, but only for a moment, the cutters resuming their position in the notch as the arm swings back.

It will be evident that instead of using curved blades any suitable cutting-tool, capable of forming a curved groove in the slab as it travels in contact therewith in a curved path, may be employed.

In another application filed by me December 18, 1885, and numbered 186,021, I have shown and claimed a cutter-head consisting of a series of curved blades arranged at right angles to the axis of the cutter-head, and with the cutting-edges of said blades on different planes. These features are also shown in this application, but not herein specifically claimed.

Without limiting myself to the precise construction and arrangement of parts shown, I claim—

1. The combination of a support for the slab, an arm, D, pivoted to move above the slab in a plane parallel thereto, an arm, F, connected to reciprocate the arm D, and a cutter carried by the arm and consisting of one or more blades curved to correspond to a circle having the pivot of the arm for its center, substantially as set forth.

2. The combination of the bed for supporting the slab, an arm carrying a curved cutter and swinging upon a pivot in a plane parallel to the slab, rotating driving-disk, and connecting-rod pivoted to the disk and to the arm to impart a lateral reciprocating motion to the latter, substantially as described.

3. The combination of the vibrating arm carrying a curved cutter and lifting-bearings for said arm, whereby the cutter is raised at intervals during its reciprocation, substantially as described.

4. The combination, with the overhanging arm C, of a vibrating arm, D, carrying a curved cutter and pivoted to the end of said arm C, as and for the purpose specified.

In testimony whereof I have signed my name to this specification in the presence of two subscribing witnesses.

JAMES W. MALOY.

Witnesses:
GEO. H. WOODMAN,
WM. J. LAVEY.